United States Patent
Suresh et al.

(10) Patent No.: US 11,483,167 B2
(45) Date of Patent: Oct. 25, 2022

(54) METHOD AND APPARATUS TO PROVIDE MEMORY BASED PHYSICALLY UNCLONABLE FUNCTIONS

(71) Applicant: Intel Corporation, Santa Clara, CA (US)

(72) Inventors: Vikram B. Suresh, Portland, OR (US); Manoj Sachdev, Waterloo (CA); Sanu K. Mathew, Portland, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 16/447,887

(22) Filed: Jun. 20, 2019

(65) Prior Publication Data

US 2020/0403813 A1    Dec. 24, 2020

(51) Int. Cl.
  *H04L 9/32* (2006.01)
  *G06F 7/58* (2006.01)

(52) U.S. Cl.
  CPC .......... *H04L 9/3278* (2013.01); *G06F 7/584* (2013.01); *G06F 2207/581* (2013.01)

(58) Field of Classification Search
  CPC .......... H04L 9/3278; G06F 7/58–588; G06F 2207/581
  See application file for complete search history.

(56) References Cited

U.S. PATENT DOCUMENTS

| | | | |
|---|---|---|---|
| 9,544,139 B2 | 1/2017 | Cox et al. | |
| 2009/0083833 A1 | 3/2009 | Ziola et al. | |
| 2012/0179952 A1 | 7/2012 | Tuyls et al. | |
| 2015/0234751 A1 | 8/2015 | Sluis et al. | |
| 2018/0131527 A1* | 5/2018 | Lu | H04L 9/3278 |
| 2019/0044739 A1 | 2/2019 | Sachdev et al. | |
| 2019/0342106 A1* | 11/2019 | Li | G11C 7/24 |
| 2020/0076624 A1* | 3/2020 | Cambou | H04L 9/0861 |
| 2021/0036872 A1* | 2/2021 | Abeln | G11C 7/24 |

FOREIGN PATENT DOCUMENTS

KR    20180128779 A    12/2018

OTHER PUBLICATIONS

International Preliminary Report on Patentability for PCT Patent Application No. PCT/US20/26694, dated Dec. 30, 2021, 7 pages.

(Continued)

*Primary Examiner* — Matthew D Sandifer
(74) *Attorney, Agent, or Firm* — Compass IP Law, PC

(57) ABSTRACT

Physically unclonable functions response in memory cells is improved by transistor sizing, transistor threshold voltage ($V_T$) and body bias in the memory cell to improve the reproducibility of the memory cell and multiple Sense Amplifiers (SA) per column to further enhance physically unclonable function entropy. A physically unclonable function exploits a large number of read-sequence-order combinations available in a physically unclonable function memory array to generate an exponentially large challenge-response pair space, without incurring the area and energy costs of hosting and operating an exponentially large memory array.

21 Claims, 7 Drawing Sheets

(56) References Cited

OTHER PUBLICATIONS

Herder, "Physical Unclonable Functions and Applications: A Tutorial", Proceedings of the IEEE, vol. 102, No. 8, Aug. 2014, 16 pgs.
Jeloka, "A sequence dependent challenge-response PUF using 28nm SRAM 6T bit cell", JSAP, 2017 Symposium on VLSI Circuits Digest of Technical Papers, 2 pages.
Neale, "A Low Energy SRAM-based Physically Unclonable Function Primitive in 28 nm CMOS", IEEE, 2015, 4 pages.
Satpathy, "A4-fJ/b Delay-Hardened Physically Unclonable Function Circuit With Selective Bit Destabilization in 14-nm Trigate CMOS", IEEE Journal of Solid-State Circuits, vol. 52, No. 4, Apr. 2017, 10 pgs.
International Search Report and Written Opinion for PCT Patent Application No. PCT/US20/26694, dated Jul. 22, 2020, 10 pages.

* cited by examiner

METHOD AND APPARATUS TO PROVIDE MEMORY BASED PHYSICALLY UNCLONABLE FUNCTIONS

FIELD

This disclosure relates to physically unclonable functions and in particular to memory based physically unclonable functions.

BACKGROUND

A physically unclonable function can be used to store chip identifying digital signatures and as seed generators to cryptographic functions for example, for secret key generation and secure authentication in integrated circuits, and systems. The physically unclonable function derives a secret from the physical characteristics of an integrated circuit. As the secret is derived from the physical characteristics of the integrated circuit, the secret can only be extracted when power is applied to the circuit. The physically unclonable function is based on the difference between integrated circuits due to manufacturing variability that is unique to each integrated circuit.

A physically unclonable function can be classified as a weak physically unclonable function or a strong physically unclonable function. A weak physically unclonable function generates a unique 'n' bit value during each power up of an integrated circuit that is primarily used as a secret key. A strong physically unclonable function accepts an 'n-bit challenge' and generates a unique response (typically 1-bit, but could be more than 1-bit) to the challenge. The challenge-response pair (CRP) is unique to the integrated circuit and can be used to securely authenticate the identity of the integrated circuit. Consequently, a strong physically unclonable function can be authenticated directly without using cryptographic circuits.

Memory cells (such as Static Random Access Memory (SRAM)) widely used in microprocessors and System-on-Chips (SoCs) are a potential source of entropy for a physically unclonable function based on the power-on state of each memory cell because manufacturing variability of the memory cells results in a random logical '1' or logical '0' state for each cell at power-on.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1A:
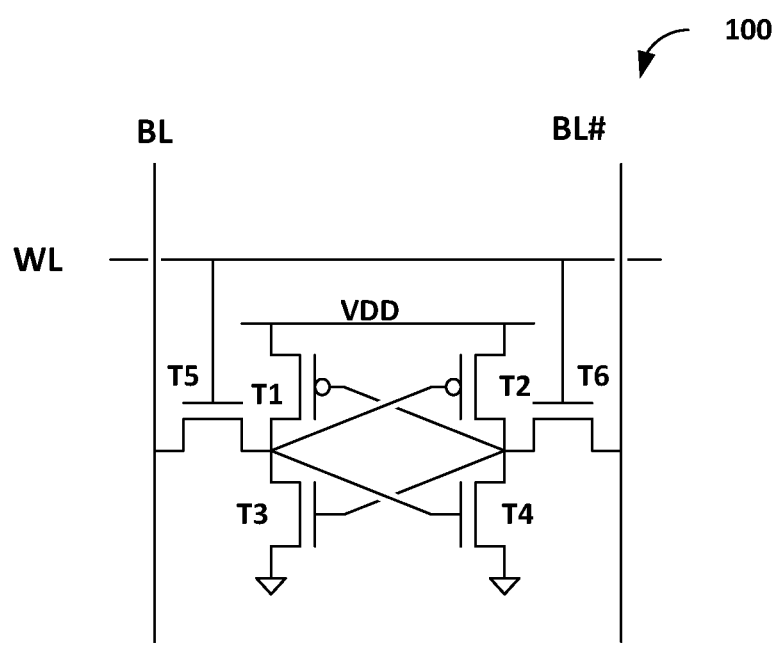
FIG. 1A is an embodiment of a six transistor (6T) SRAM cell.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

However, SRAM cells exhibit time-varying behavior when they are powered up. This results in poor reproducibility or reliability of physically unclonable function response and Error-Correcting Codes (ECC) may be needed.

Memory based physically unclonable function (for example, SRAM cells) have been primarily used as static entropy source for key generation because they are considered a weak physically unclonable function because there is only one possible challenge-response pair (the state of the SRAM cells after power-up). Since one of the requirements for strong physically unclonable functions is to have an exponentially large challenge-response pair (CRP) space, this would require an exponentially large memory array (weak physically unclonable function) that generates a large amount of static entropy.

Physically unclonable functions response in SRAM cells is improved by transistor sizing, transistor threshold voltage ($V_T$) and body bias in the SRAM cell to improve the reproducibility of the SRAM cell and multiple Sense Amplifiers (SA) per column to further enhance physically unclonable function entropy.

A strong physically unclonable function exploits the large number of read-sequence-order combinations available in a physically unclonable function memory array to generate an exponentially large challenge-response pair space, without incurring the area and energy costs of an exponentially large memory array. In particular, a system includes a Static Random Access Memory (SRAM) array, and a read sequencer whose read sequence depends on the challenge. The SRAM array is used to generate a set of random values using the power-cycling technique as used by SRAM physically unclonable functions. The physically unclonable function challenge is used to select m/2 random bits from the m×1 bit SRAM array, with challenge bits determining both the array address, as well as access sequence order of array bits, resulting in a large challenge-response space, sufficient for authentication.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature structure, or characteristic described in conjunction with the embodiment can be included in at least one embodiment of the invention. The appearances of the phrase "in one embodiment" in various places in the specification do not necessarily all refer to the same embodiment.

FIG. 1A is an embodiment of a six transistor (6T) SRAM cell 100. Each transistor may be a metal-oxide-semiconductor field-effect transistor (MOSFET). Transistors T1 and T2 are P-channel MOSFET (NMOS) transistors and transistors T3, T4, T5 and T6 are N-channel MOSFET (PMOS) transistors. Each bit in the 6T SRAM cell 100 is stored in a storage cell comprising four transistors (T1, T2, T3, T4) that form two cross-coupled inverters. The storage cell has two stable states which are used to store a logic 0 or logic 1.

Two additional access transistors T5 and T6 control access to the storage cell during read and write operations. The access transistors T5 and T6 are turned on whenever a word line (WL) is activated for read or write operation, connecting the storage cell to the complementary bit lines (BL, BL #). When the word line is not activated, the access transistors T5 and T6 are turned off and the data is retained in the storage cell while power is applied to the 6T SRAM cell 100.

The SRAM cell is a volatile memory that is, data in the storage cell is lost when power is not applied. When power is applied, due to inherent mismatch between the transistors (T1, T2, T3, T4) in the storage cell, the storage cell has an intrinsic bias toward a particular stable state (logic 1 or logic 0). Typically, the SRAM cell 100 is designed so that the SRAM cell 100 is unbiased and is robust against process variation.

For an ideal, symmetric SRAM cell 100 (that is, no mismatch between the transistors) the internal data of the SRAM cell 100 takes on a metastable state during system power up. An environmental noise source can push the SRAM cell 100 toward one of its bi-stable states (logic 1 or logic 0). Any local mismatch between paired transistors (transistor pair T1 (NMOS) and T3 (PMOS) or transistor pair T2 (NMOS) and T4 (PMOS)) essentially skews the SRAM cell 100 from its metastable starting point and provides an initial bias toward one of the bi-stable states of the SRAM cell 100. By increasing the sensitivity of the SRAM cell 100 to local mismatch between paired transistors, the probability for a greater initial bias is increased, and the reproducibility of the state of the SRAM cell 100 after power is applied is more robust to fluctuating environmental conditions. The higher the impact of process variation on the behavior of the SRAM cell 100, the higher will be the reproducibility of the power-on stable state on repeated power-up cycles.

Both the NMOS driver devices and PMOS load devices in the SRAM cell impact the initial asymmetric bias of the SRAM cell. The cell variability (σcell) can be characterized as the sum of the NMOS driver and PMOS load device's variances and is dependent on transistor area (width× length). For example, mismatch between two transistors is dependent on the area (W×L) of each transistor. Therefore, by making NMOS (or PMOS) transistors large compared to PMOS (or NMOS), the cell variability can be reduced. To ensure reproducibility of the power-on stable state at power-up, one of the transistors in each transistor pair may have a larger area than the other, for example, the NMOS (or PMOS) transistors in the transistor pairs can have a larger area compared to the PMOS (or NMOS) transistor in the transistor pairs.

The threshold voltage ($V_{th}$) of a transistor is the minimum gate-to-source voltage $V_{GS}$ that is needed to create a conducting path between source and drain terminals of the transistor. To ensure reproducibility of the power-on stable state at power-up, the NMOS (or PMOS) transistors have a low threshold voltage and the PMOS (or NMOS) transistors have high threshold voltage.

Figure 1B:
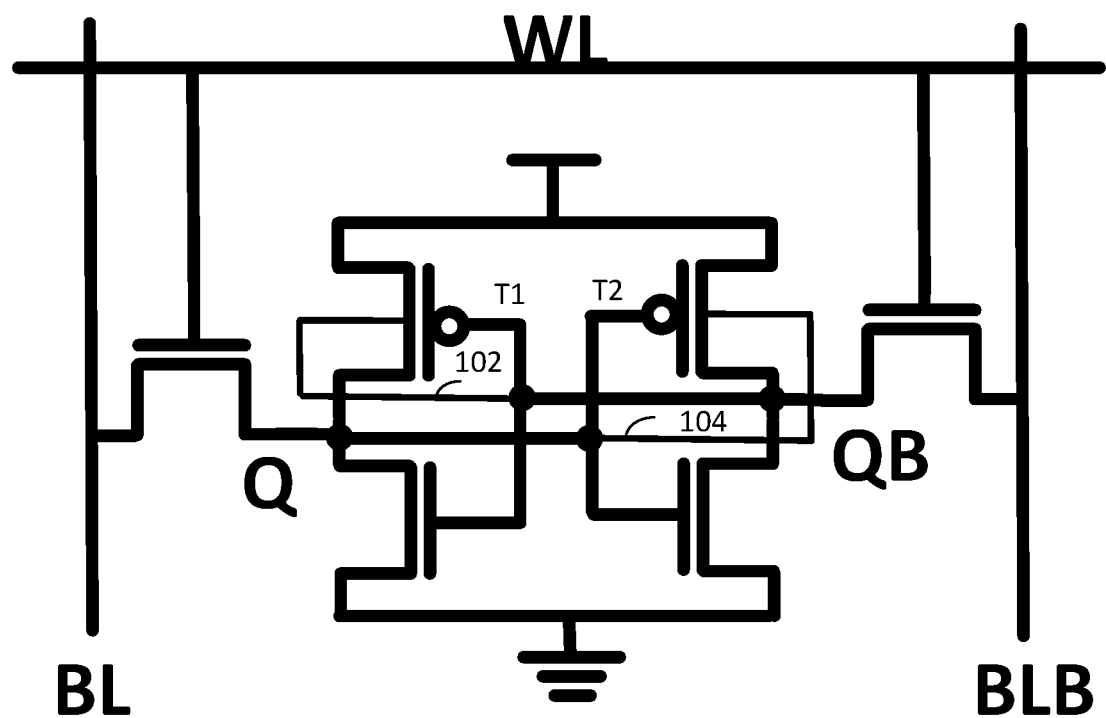
FIG. 1B illustrates an embodiment of the SRAM cell shown in FIG. 1A.

The reproducibility of the power-on stable state at power-up can be further improved by connecting the body of the PMOS transistor body to the gate of the PMOS transistor to create a Forward Body Bias (FBB) to the PMOS transistor that is being tuned-on as the supply voltage is ramped-up the supply voltage. The other PMOS transistor in the SRAM cell does not have a Reverse Body Bias or a Forward Body Bias. FIG. 1B illustrates an embodiment of the SRAM cell shown in FIG. 1A with a first connection 102 between the body and gate of T1 and a second connection 104 between the body and gate of T2.

A SRAM memory chip (integrated circuit) comprises an array of rows and columns of six transistor (6T) SRAM cells 100 described in conjunction with FIG. 1A. Each SRAM cell 100 in a row is coupled to a word-line (WL) associated with the row and each SRAM cell 100 in a column is coupled to two complimentary bit-lines (BL, BL #). Each SRAM cell 100 lies at, the intersection of a particular word-line and bit-line, which can be used to "address" it. To read the state of the SRAM cell 100, the word-line is activated (for example, set to logic 1) activating all SRAM cells 100 in the row that are coupled to the word line. The signal on the complementary bit-lines (BL, BL #) is dependent on the state of the SRAM cell 100. A sense amplifier coupled to the complementary bit lines (BL, BL #) senses the signal on the bit lines to output an amplified signal that represents the state of the SRAM cell (logic 1 or logic 0).

Figure 2:
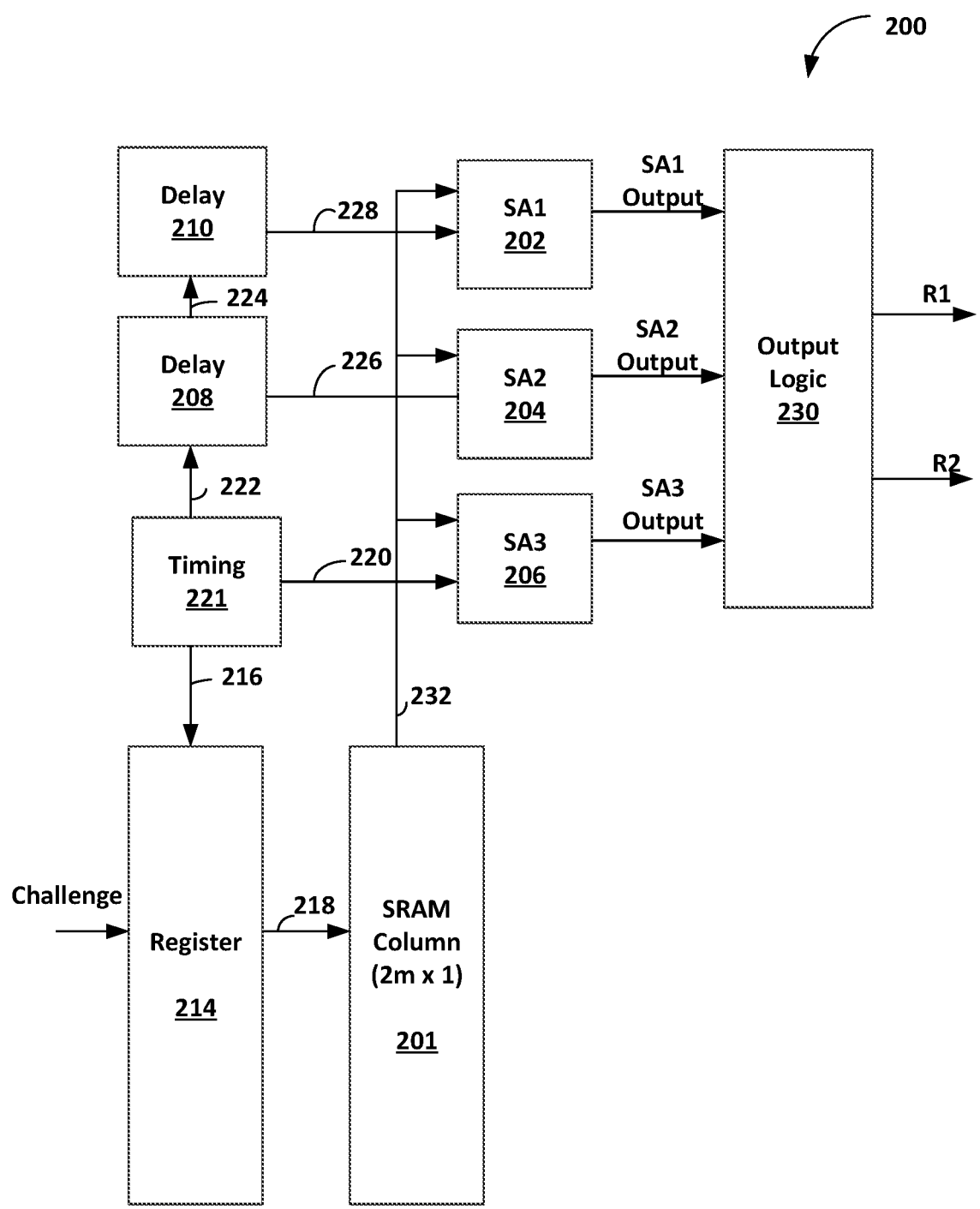
FIG. 2 is a block diagram of a portion of an SRAM memory array with multi-sense entropy extraction.

FIG. 2 is a block diagram of a portion of an SRAM memory array 200 with multi-sense entropy extraction. The complementary bit lines (BL, BL #) 232 from each of a plurality of SRAM cells 100 in an SRAM column 201 are coupled to an odd number of sense amplifiers, in the embodiment shown in FIG. 2 there are three sense amplifiers (SA) SA1 202, SA2 204, SA3 206. In other embodiments there can be any odd number of sense amplifiers greater than three (for example, 5, 7, 9 . . . ). The two additional sense amplifiers (SA1 202, SA2 204) are used to capture the variability of the current drive on the complementary bit lines (BL, BL #) 232 in an SRAM cell 100 in the SRAM column 201 to enhance the entropy of the physically unclonable function.

The SRAM memory array 200 includes a register 214, timing block 212, and two delay blocks (delay 1 208 and delay 2 210). Timing block 221 outputs a first control signal 216 to the register 214 to enable the register 214 to output an address 218 to the SRAM column 201 to select an SRAM cell 100 in SRAM column 201. Timing block 221 outputs a second control signal 220 to sense amplifier SA3 206 to enable sense amplifier SA3 206 to output SA3 output. Timing block 221 also outputs a third control signal to delay 1 208 to output a fourth control signal 226 to enable sense amplifier SA2 204 to output SA2 output. Timing block 221 also outputs a fifth control signal to delay 2 210 to output a sixth control signal 228 to enable sense amplifier SA1 202 to output SA1 output.

Sense amplifier SA1 202 has relaxed timing (based on the delay provided by two delay blocks (delay 1 208 and delay 2 210)) to provide reliable sensed data. Sense amplifier SA2 204 and sense amplifier SA3 206 have increasingly aggressive timing (sense amplifier SA3 (no delay), sense amplifier SA2 (delay provided by delay block 208)). Typically, both sense amplifier SA1 202 and sense amplifier SA2 204 provide a reliable result, that is, SA1 output and SA2 output. Typically, sense amplifier SA3 206 provides the same result on SA3 output as sense amplifier SA2 204 and sense amplifier SA1 202 at their respective outputs SA2 output, SA1 output, if the SRAM cell current is higher than the nominal, and the opposite result if not.

Output logic 230 receives the SA outputs (SA1 output, SA2 output, SA3 output) from respective sense amplifiers SA1 202, SA2 204, SA3 206 and provides two results R1, R2—(i) Result R1 is majority output (M); and (ii) Result R2 is a one bit difference (D). The value of the majority output (M) signifies output produced by two or more sense amplifiers SA1 202, SA2 204, SA3 206. The value of the difference (D) is 'true' if one of the sense amplifiers SA1 202, SA2 204, SA3 is the complementary output (for example, the output of two of the sense amplifiers is logic 1 and the output of the third sense amplifier is logic 0). The majority output (M) is processed by output logic 230 to produce the physically unclonable function response (R1). The difference bit D is used to provide a supporting evidence of the uniqueness of the physical unclonable function and can be processed by the output logic 230 to provide the R2 response.

In an embodiment, both response R1 and response R2 output from output logic 230 are sent to an authenticating server. For example, the authenticating server can send a series of m challenges that are stored in register 214; and in response the physically unclonable function sends m R1 and R2 responses, respectively. The R2 responses, can be used to ascertain the reliability of the physical unclonable function. In such a physical unclonable function, the overall SRAM cell entropy is determined by the logic level (state of the SRAM cell) of the SRAM cell as well as by the read current of the SRAM cell.

The timing of the control signals to enable the sense amplifiers can be selected such that that nominally sense amplifiers SA1 202 and SA3 206 capture complementary data (one is logic 1 and the other is logic 0). For example, the timing for sense amplifier SA1 202 can be further relaxed while the timing for sense amplifier SA3 206 is constrained, so that sense amplifier SA3 206 is capturing the correct data only 50% of the time.

The Physically Unclonable Function (PUF) produces a unique response on each chip for the same challenge using a single access of the SRAM. The challenge-response space of a conventional SRAM physically unclonable function is equal to the number of bits in the SRAM. A challenge/response from a sequence of accesses to the SRAM with the unique response dependent on the order of the sequence of accesses increases attack resistance by making it more difficult to learn the unique response using a machine algorithm.

In an embodiment, a large number of read-sequence-order combinations available in a small memory array are used to generate an exponentially large challenge response space, without incurring the area and energy costs of hosting and operating a large memory array. A read sequence of a read sequencer is dependent on a challenge. The challenge is used to select m/2 random bits from an m×1 bit memory array, with challenge bits determining both the array address and an access sequence order of array bits. A contention is created between two (or more) SRAM cells successively, dependent on the challenge. In an embodiment in which m is 128, the number of random bits is 64, the memory array is 128 bits, and the challenge-response space is $2^{420}$. In other embodiments, m can be less than or greater than 128.

The challenge response space for SRAM physically unclonable functions is increased through combination and sequencing of SRAM address space to allow the SRAM to be used for authentication. A traditional SRAM-based strong physically unclonable function requires $2^{420}$ bits to generate a challenge response space of $2^{420}$ bits. In an embodiment, a challenge response space of $2^{420}$ bits is provided by a traditional 128-bit SRAM array with fully-synthesizable peripheral logic to realize the exponentially large challenge space.

In a typical SRAM architecture, challenges are sent to the address decoder which leads to significantly large array size. For example, for a 64 bit challenge, $2^{64}$ SRAM cells are required.

Figure 3:
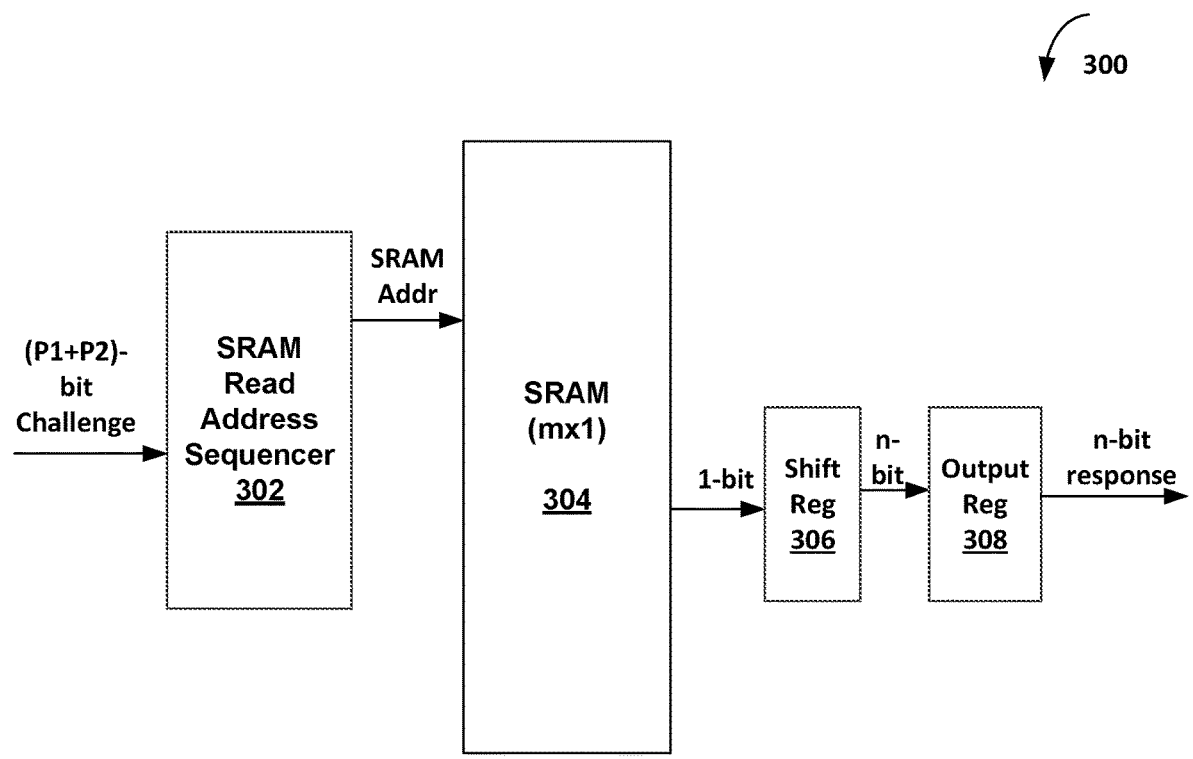
FIG. 3 is a block diagram of challenge-response physical unclonable function circuitry that includes physical unclonable function SRAM cells described in conjunction with FIG. 1A, FIG. 1B and FIG. 2 in a SRAM array and a SRAM read address sequencer.

FIG. 3 is a block diagram of challenge-response physical unclonable function circuitry 300 that includes physical unclonable function SRAM cells described in conjunction with FIG. 1A, FIG. 1B and FIG. 2 in a SRAM array 304 and a SRAM read address sequencer 302. In the embodiment shown, an array of m cells in the SRAM array has a single column with m rows (that is, a m×1 array). The m SRAM cells in the m×1 SRAM array 304 provides the source of entropy for the physically unclonable function circuitry. The SRAM read address sequencer 302 performs a pseudo-random selection of addresses for the SRAM array 304 based on the state of a x-bit challenge input to the SRAM read address sequencer 302 to randomly select n of the m bits in the SRAM array 304 that are used to generate the response to the challenge.

For each read address, the bit is read from the cell at that address in the SRAM array 304 and loaded into an n-bit shift register 306. After n separate bit-locations in the SRAM array 304 have been read, the n-bits in the n-bit shift register 306 are stored in an n-bit output register 308. The n-bits in the n-bit output register can be compressed into a single bit response using functions that are known to those skilled in the art.

Figure 4:
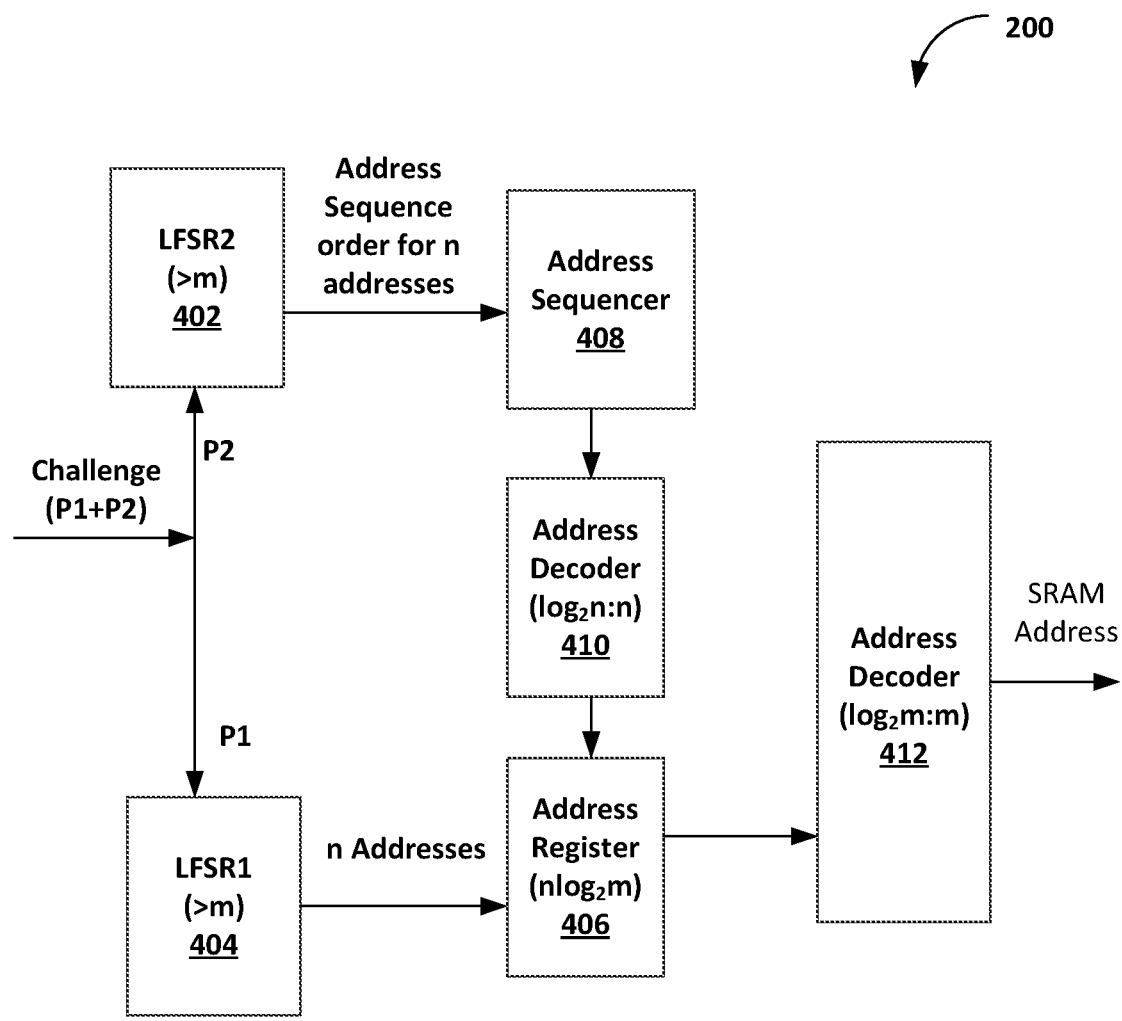
FIG. 4 is an embodiment of the SRAM read address sequencer shown in FIG. 3.

FIG. 4 is an embodiment of the SRAM read address sequencer 302 shown in FIG. 3. The SRAM read address sequencer 302 includes two linear-feedback shift registers (LFSR) 402, 404. A linear-feedback shift register (LFSR) is a shift register whose input bit is a linear function of its previous state. An example of a linear function is Exclusive OR (XOR). The initial value of the LFSR is called the seed and the pseudo-random output is determined by current (or previous state).

LFSR 402 enables the pseudo-random selection of the memory addresses for SRAM 304. LFSR 404 enables selection of a sequence of the memory addresses from the selected memory addresses. LFSR 402 generates unique sequences of (m/2) SRAM addresses. Therefore, there are (m/2)! (the product of integer numbers from 1 to m/2) possible sequences. The largest size of LFSR 404 is $\log_2((m/2)!)$.

The operation of the SRAM read address sequencer 302 will be described for 128 SRAM cells (m=128); 64 response bits (n=64); 124-bit LFSR 402 (p1=124); and 296-bit LFSR 404 (p2=296); 420-bit challenge (p1+p2). For the SRAM of address space m=128, m/2=64 addresses are selected to provide $^mC_{m/2}$ combinations (that is, the number of m/2 subsets that can be formed from m bits). The operation of the SRAM read address sequencer 302 will be described in conjunction with FIG. 4 and FIG. 5.

Figure 5:
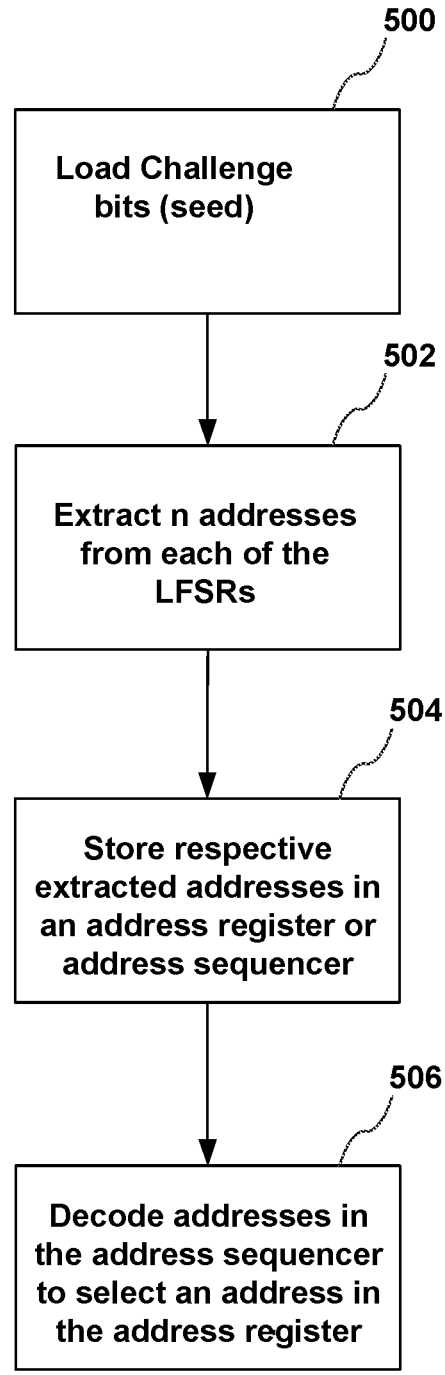
FIG. 5 is a flowgraph illustrating a method to provide a large challenge-response space for secure authentication with entropy provided by an SRAM cell.

FIG. 5 is a flowgraph illustrating a method to provide a large challenge-response space for secure authentication with entropy provided by a SRAM cell.

At block 500, the 420 challenge bits, 124-bits (p1) & 296-bits (p2), are loaded into LFSR1 and LFSR2, respectively.

At block 502, The LFSR1 runs for several, pre-determined, clock cycles producing a pseudo-random sequence. At periodic intervals, 64 7-bit SRAM addresses, are extracted from the pseudo-random LFSR data stream.

Assuming LFSR 404 is of maximal length, LFSR 404 has a cycle time of $(2^{p1}-1)$ where p1 is the length of the LFSR. Consequently, the size of the largest LFSR 404 which enables this selection is $\log_2({}^mC_{m/2})$. Therefore, the number of challenges sent to LFSR 404 are also equal to $\log_2({}^mC_{m/2})$.

Similar to LFSR 404, LFSR 402 operates for several, pre-determined, cycles and produces 64 6-bit addresses at a regular interval. LFSR 402 generates unique sequences of (m/2) SRAM addresses. Therefore, there are (m/2)! (the product of integer numbers from 1 to m/2) possible sequences. The largest size of LFSR 404 is $\log_2((m/2)!)$. A further increase in the size of LFSR 402 and LFSR 404 will not increase the challenge space because the SRAM address space (for example, m bits) is the limiting factor. The SRAM read address sequencer 302 enables combination and sequencing of SRAM address space, and enables a large (>400) Challenge-Response Pairs space without significant cost.

At block 504, the extracted addresses are stored. Extracted addresses from LFSR 404 are stored in the Address Register 406 (that may also be referred to as a physically unclonable function address register). Extracted addresses from LFSR 402 are stored in the Address Sequencer 408 (that may also be referred to as a physically unclonable function address sequencer).

At block 506, LFSR 402 is used to generate a unique sequence of addresses for the SRAM. The unique sequence of addresses is unique for each challenge. Each address stored in the address sequencer 408 is sequentially decoded by the Address Decoder 410 to select a 7-bit location in the Address Register 406. The content (7 bits) of this location identifies an SRAM address which is decoded by Address Decoder 412 and used to access the location in SRAM. Subsequently, the content of the identified SRAM location are read and loaded into n-bit shift register 306 (FIG. 3).

LFSR 402 and LFSR 404 enable parallel execution of address generation, as well as its sequencing. In another embodiment, LFSR 402 and LFSR 404 can be implemented as a single LFSR that executes the two operations performed by LFSR 402 and LFSR 404 sequentially, reducing the area and energy footprint of the SRAM read address sequencer 302.

The read sequencer circuitry is independent of the source of entropy. In another embodiment, the source of entropy can be provided by another memory array or by other physically unclonable functions, for example, an arbiter physically unclonable function, a delay-based physically unclonable function, a current-mirror physically unclonable function or other non-volatile memory based physically unclonable function.

Figure 6:
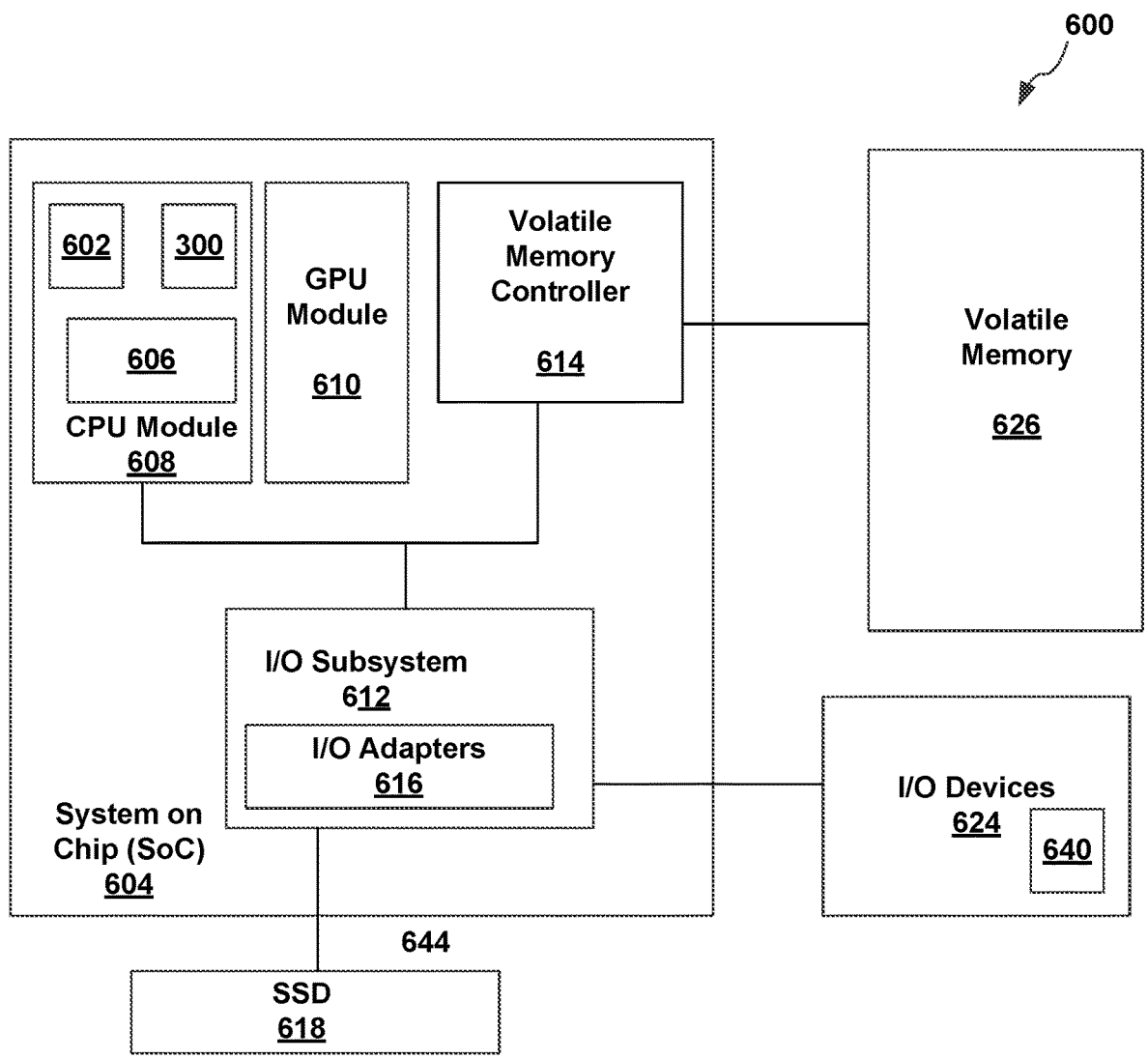
FIG. 6 is a block diagram of an embodiment of a computer system that includes challenge-response physical unclonable function circuitry.

FIG. 6 is a block diagram of an embodiment of a computer system 600 that includes challenge-response physical unclonable function circuitry 300. Computer system 600 can correspond to a computing device including, but not limited to, a server, a workstation computer, a desktop computer, a laptop computer, and/or a tablet computer.

The computer system 600 includes a system on chip (SOC or SoC) 604 which combines processor, graphics, memory, and Input/Output (I/O) control logic into one SoC package. The SoC 604 includes at least one Central Processing Unit (CPU) module 608, a volatile memory controller 614, and a Graphics Processor Unit (GPU) 610. In other embodiments, the volatile memory controller 614 can be external to the SoC 604. The CPU module 608 includes at least one processor core 602, a level 2 (L2) cache 606 and challenge-response physical unclonable function circuitry 300.

Although not shown, each of the processor core(s) 602 can internally include one or more instruction/data caches, execution units, prefetch buffers, instruction queues, branch address calculation units, instruction decoders, floating point units, retirement units, etc. The CPU module 608 can correspond to a single core or a multi-core general purpose processor, such as those provided by Intel® Corporation, according to one embodiment.

The Graphics Processor Unit (GPU) 610 can include one or more GPU cores and a GPU cache which can store graphics related data for the GPU core. The GPU core can internally include one or more execution units and one or more instruction and data caches. Additionally, the Graphics Processor Unit (GPU) 610 can contain other graphics logic units that are not shown in FIG. 6, such as one or more vertex processing units, rasterization units, media processing units, and codecs.

Within the I/O subsystem 612, one or more I/O adapter(s) 616 are present to translate a host communication protocol utilized within the processor core(s) 602 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 616 can communicate with external I/O devices 624 which can include, for example, user interface device(s) including a display and/or a touch-screen display 640, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)). The I/O adapter(s) 616 can also communicate with a solid-state drive ("SSD") 618.

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The I/O adapters 616 can include a Peripheral Component Interconnect Express (PCIe) adapter that is communicatively coupled using the NVMe (NVM Express) over PCIe (Peripheral Component Interconnect Express) protocol over bus 644 to a host interface 628 in the SSD 618. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Volatile memory 626 is communicatively coupled to the volatile memory controller 614. Volatile memory 626 is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014), HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

An operating system 642 is software that manages computer hardware and software including memory allocation and access to I/O devices. Examples of operating systems include Microsoft® Windows®, Linux®, iOS® and Android®.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
   a volatile memory array to generate a set of random values using a power-cycling technique; and
   a read sequencer to receive a plurality of challenge bits and to use the plurality of challenge bits to select a plurality of random bits from the set of random values in the volatile memory array, the read sequencer to use a first portion of the challenge bits to generate a first plurality of n addresses, to use a second portion of the challenge bits to generate a second plurality of n addresses, and to use the second plurality of n addresses to select a sequence order for the first plurality of n addresses to read the plurality of random bits from the set of random values in the volatile memory array to generate an exponentially large challenge-response pair space from which to select the plurality of random bits.

2. The apparatus of claim 1, wherein the read sequencer to include a first linear-feedback shift register and a second linear-feedback shift register, the first linear-feedback shift register to generate the first plurality of n addresses and the second linear-feedback shift register to generate the second plurality of n addresses to select the sequence order for the first plurality of n addresses.

3. The apparatus of claim 1, wherein, the volatile memory array has m rows and one column, the plurality of random bits is m/2, a number of challenge bits is p, the challenge-response pair space is $2^p$, and n=m/2.

4. The apparatus of claim 3, wherein m is 128, p is 420, the first portion of the challenge bits is 296 and the second portion of the challenge bits is 124.

5. The apparatus of claim 1, wherein the volatile memory array is a static random access memory.

6. The apparatus of claim 5, wherein the static random access memory includes a static random access memory cell with an odd number of sense amplifiers to enhance reproducibility of a power-up state, the odd number of sense amplifiers greater than two.

7. The apparatus of claim 6, wherein the static random access memory further includes a plurality of delay blocks, each delay block coupled to one of sense amplifiers, the delay block to delay the read random values from the volatile memory array.

8. A method comprising:
generating a set of random values in a volatile memory array using a power-cycling technique; and
using a read sequencer to select a plurality of random bits from the set of random values in the volatile memory array using a plurality of received challenge bits, comprising:
generating a first plurality of n addresses using a first portion of the received challenge bits;
generating a second plurality of n addresses using a second portion of the received challenge bits;
using the second plurality of n addresses to select a sequence order for the first plurality of n addresses; and
reading the plurality of random bits from the set of random values in the volatile memory array using the sequence order to generate an exponentially large challenge-response pair space from which to select the plurality of random bits.

9. The method of claim 8, wherein a first linear-feedback shift register to generate the first plurality of n addresses and a second linear-feedback shift register to generate the second plurality of n addresses to select the sequence order for the first plurality of n addresses.

10. The method of claim 8, wherein, the volatile memory array has m rows and one column, the plurality of random bits is m/2, a number of challenge bits is p, and the challenge-response pair space is $2^p$, and n=m/2.

11. The method of claim 10, wherein m is 128, p is 420, the first portion of the received challenge bits is 296 and the second portion of the received challenge bits is 124.

12. The method of claim 8, wherein the volatile memory array is a static random access memory.

13. The method of claim 12, wherein the static random access memory includes a static random access memory cell with an odd number of sense amplifiers to enhance reproducibility of a power-up state, the odd number of sense amplifiers greater than two.

14. The method of claim 13, wherein the static random access memory further includes a plurality of delay blocks, each delay block coupled to one of sense amplifiers, the delay block to delay the read random values from the volatile memory array.

15. A system comprising:
a processor, the processor comprising:
a volatile memory array to generate a set of random values using a power-cycling technique; and
a read sequencer to receive a plurality of challenge bits and to use the plurality of challenge bits to select a plurality of random bits from the set of random values in the volatile memory array, the read sequencer to use a first portion of the challenge bits to generate a first plurality of n addresses, to use a second portion of the challenge bits to generate a second plurality of n addresses, and to use the second plurality of n addresses to select a sequence order for the first plurality of n addresses to read the plurality of random bits from the set of random values in the volatile memory array to generate an exponentially large challenge-response pair space from which to select the plurality of random bits; and
a display communicatively coupled to the processor.

16. The system of claim 15, wherein the read sequencer to include a first linear-feedback shift register and a second linear-feedback shift register, the first linear-feedback shift register to generate the first plurality of n addresses and the second linear-feedback shift register to generate the second plurality of n addresses to select the sequence order for the first plurality of n addresses.

17. The system of claim 15, wherein, the volatile memory array has m rows and one column, the plurality of random bits is m/2, a number of challenge bits is p, the challenge-response pair space is $2^p$, and n=m/2.

18. The system of claim 17, wherein m is 128, p is 420, the first portion of the challenge bits is 296 and the second portion of the challenge bits is 124.

19. The system of claim 15, wherein the volatile memory array is a static random access memory.

20. The system of claim 19, wherein the static random access memory includes a static random access memory cell with an odd number of sense amplifiers to enhance reproducibility of a power-up state, the odd number of sense amplifiers greater than two.

21. The system of claim 20, wherein the static random access memory further includes a plurality of delay blocks, each delay block coupled to one of sense amplifiers, the delay block to delay the read random values from the volatile memory array.

* * * * *